United States Patent
Sugitatsu et al.

(10) Patent No.: US 8,262,766 B2
(45) Date of Patent: Sep. 11, 2012

(54) METHOD FOR REDUCING CHROMIUM CONTAINING RAW MATERIAL

(75) Inventors: Hiroshi Sugitatsu, Kobe (JP); Hidetoshi Tanaka, Kobe (JP); Takao Harada, Kobe (JP); Itsuo Miyahara, Kobe (JP); Isao Kobayashi, Kobe (JP)

(73) Assignee: Kobe Steel, Ltd., Kobe-shi (JP)

(*) Notice: Subject to any disclaimer, the term of this patent is extended or adjusted under 35 U.S.C. 154(b) by 517 days.

(21) Appl. No.: 12/543,798

(22) Filed: Aug. 19, 2009

(65) Prior Publication Data
US 2010/0037728 A1 Feb. 18, 2010

Related U.S. Application Data

(63) Continuation of application No. 10/541,457, filed as application No. PCT/JP03/16913 on Dec. 26, 2003, now abandoned.

(30) Foreign Application Priority Data

Jan. 7, 2003 (JP) ................................. 2003-001200

(51) Int. Cl.
 *C21B 11/00* (2006.01)
(52) U.S. Cl. ........................................... 75/484; 75/503
(58) Field of Classification Search ...................... 75/484
 See application file for complete search history.

(56) References Cited

U.S. PATENT DOCUMENTS

| | | | |
|---|---|---|---|
| 5,567,224 A | 10/1996 | Kundrat | |
| 5,730,775 A | 3/1998 | Meissner et al. | |
| 6,270,552 B1 | 8/2001 | Takeda et al. | |
| 6,413,295 B2* | 7/2002 | Meissner et al. | 75/484 |
| 6,582,491 B2* | 6/2003 | Hoffman et al. | 75/10.63 |
| 6,592,649 B2 | 7/2003 | Kikuchi et al. | |
| 6,755,888 B2 | 6/2004 | Ibaraki et al. | |
| 2002/0033075 A1 | 3/2002 | Kikuchi et al. | |
| 2009/0183600 A1* | 7/2009 | Kikuchi et al. | 75/484 |

FOREIGN PATENT DOCUMENTS

| | | |
|---|---|---|
| JP | 9-209047 | 8/1997 |
| RU | 2 194 771 C2 | 4/2002 |
| SU | 1466652 A3 | 3/1989 |

OTHER PUBLICATIONS

Perry's Chemical Engineer's Handbook, McGraw-Hill, 7$^{th}$ Edition, pp. 5-23-5-32 (1997).

* cited by examiner

*Primary Examiner* — George Wyszomierski
*Assistant Examiner* — Tima M McGuthry Banks
(74) *Attorney, Agent, or Firm* — Oblon, Spivak, McClelland, Maier & Neustadt, L.L.P.

(57) ABSTRACT

An object of the present invention is to provide a method for reducing a chromium-containing material at a high chromium reduction degree. In the method of the present invention, a mixture of a feedstock containing chromium oxide and a carbonaceous reductant is heated and reduced by radiation heating in a moving hearth furnace. The average rate of raising the temperature of the mixture in the reduction is preferably 13.96° C./s or higher in the period from the initiation of the radiation heating of the mixture until the mixture reaches 1,114° C.

15 Claims, 3 Drawing Sheets

METHOD FOR REDUCING CHROMIUM CONTAINING RAW MATERIAL

This is a continuation application of U.S. application Ser. No. 10/541,457, filed Jul. 6, 2005, now abandoned, which is a 371 of PCT/JP03/16913 filed on Dec. 26, 2003.

TECHNICAL FIELD

The present invention belongs to the field of ferrochromium manufacturing technology and, specifically, relates to methods for reducing a chromium-containing material.

BACKGROUND ART

High-carbon ferrochromium (hereinafter simply referred to as "ferrochromium") is manufactured by smelting and reducing chromium ore after pretreatment in a submerged arc electric furnace (hereinafter simply referred to as "electric furnace"). Examples of the pretreatment of the chromium ore include briquetting, sintering, pellet firing, and pellet prereduction.

In pellet prereduction, chromium ore is pulverized with coke and is granulated to prepare green pellets, which are then subjected to reduction roasting in a rotary kiln at 1,300° C. or higher to provide prereduced pellets. The reduction degree of the prereduced pellets, which is 60% to 70% only with the internally added coke, reaches 80% in combination with externally added coke. This method therefore has a significantly smaller amount of heat required for the reduction of chromium ore in an electric furnace than other types of pretreatment, thus greatly reducing power consumption.

Pellet prereduction is an excellent method with low power consumption; however, this method, involving the use of a rotary kiln for the pretreatment, has the following many problems unique to the rotary kiln. Because the fundamental principle of the rotary kiln is based on the tumbling of feedstock, the rotary kiln disadvantageously produces a large amount of dust to readily cause dam rings therein. In addition, the rotary kiln requires an excessive length due to variations in the residence time of the feedstock, thus involving a large equipment installation area and a large surface area. Consequently, the rotary kiln disadvantageously dissipates a large amount of heat, leading to high fuel consumption. Furthermore, a combination with externally added coke is disadvantageous in that it causes a large oxidation loss of the externally added coke in the rotary kiln.

Chromium oxide is reduced less easily than iron oxide from a thermodynamic point of view. The temperature of the pellets in the kiln is gradually raised by heating the pellets with a burner provided on a discharge end of the kiln. Accordingly, the internally added coke is consumed preferentially in the reduction of iron oxide contained in the chromium ore since iron oxide is reduced more easily than chromium oxide. As a result, the reduction of chromium oxide lags behind since chromium oxide is reduced less easily than iron oxide.

To solve the above problems unique to rotary kilns, methods are proposed in which a rotary hearth furnace is used for the prereduction.

In one method, green pellets prepared by adding a carbonaceous material to a steel mill waste containing Cr and Fe and granulating the mixture are preheated to about 600° C. to 800° C. with a shaft preheater, are charged into a rotary hearth furnace, and are gradually heated to about 1,000° C. to 1,800° C. in a reducing atmosphere.

In another method, green pellets prepared by adding a proper amount of chromium ore to a chromium-containing waste produced in the manufacturing process of stainless steel and granulating the mixture with coke are placed on a hearth of a rotary hearth furnace and are heated with a combustion gas to manufacture pellets containing chromium and iron.

The above methods, in contrast to rotary kilns, produce a less amount of dust and therefore cause no dam ring because the feedstock placed on the rotary hearth is stationary. In addition, no excessive hearth area is required since the residence time of the feedstock is uniform. Accordingly, the equipment used is more compact and the furnace surface area is smaller, so that the furnace has a less amount of heat dissipated to provide lower fuel consumption.

In the above methods, however, the internally added carbonaceous material starts to reduce iron oxide even at about 600° C. to 800° C. in the shaft preheater (while the carbonaceous material does not reduce chromium oxide at such temperatures). In addition, the pellets are gradually heated in the rotary hearth furnace; as a result, the carbonaceous material is consumed preferentially in the reduction of iron oxide. By the time the furnace reaches the temperature at which the reduction of chromium oxide can start, the chromium oxide loses the opportunity to come into contact with the carbonaceous material for lack of the carbonaceous material to give a low chromium reduction degree. On the other hand, increasing the amount of carbonaceous material added internally to maintain the contact opportunity causes the following typical problems: the green pellets disintegrate due to a decrease in strength to form deposits on the hearth; the dust loss from the rotary hearth furnace to the flue gas is increased; and the reduced pellets disintegrate, or otherwise their density decreases, to cause difficulty in dissolving in molten metal in an electric furnace, leading to a lower smelting yield.

Furthermore, the above methods make no mention of the heating temperature and temperature raising rate of the pellets and the above problem that the reduction of chromium oxide lags behind.

Accordingly, an object of the present invention is to provide a method for reducing chromium oxide in a chromium-containing material (a method for manufacturing reduced chromium). When a chromium-containing material that contains chromium oxide and iron oxide and is provided with an internally mixed carbonaceous material is reduced (prereduced), the method of the present invention can promote the reduction of chromium oxide while suppressing preferential consumption of the internally added carbonaceous material in the reduction of iron oxide, thereby increasing the chromium reduction degree.

DISCLOSURE OF INVENTION

The present invention provides a method for reducing a chromium-containing material, including a mixing step of mixing a chromium-containing material containing chromium oxide and iron oxide and a carbonaceous reductant to provide a mixture; and a reducing step of heating and reducing the mixture with a rapid temperature rise by radiation heating in a moving hearth furnace to provide a reduced mixture.

If the temperature of the mixture is rapidly raised in the moving hearth furnace, the reduction of chromium oxide can be allowed to start before the internally added carbonaceous material in the mixture is consumed in the reduction of iron oxide. Accordingly, the reduction of chromium oxide proceeds while the contact opportunity between chromium iron and the internally added carbonaceous material is maintained. This method can therefore provide a reduced mixture having a high chromium reduction degree. In particular, a moving hearth furnace in which a feedstock placed on the hearth is stationary is preferably used for the heating and reduction of the mixture. The use of such a furnace can significantly reduce the amount of dust produced and prevent dam rings due to dust deposited on the furnace wall. In addition, this furnace does not require extensive equipment as required for rotary kilns since the residence time of the mixture is uniform in the furnace. Accordingly, the equipment used is more compact and therefore provides the advantages of a smaller installation area and a less amount of heat dissipated.

In the present invention, the average rate of raising the temperature of the mixture in the reducing step is preferably 13.6° C./s or higher in the period from the initiation of the radiation heating of the mixture until the mixture reaches 1,114° C.

A rapid temperature rise at the above temperature raising rate provides the above effects more reliably.

In the present invention, the reducing step is preferably performed at 1,250° C. to 1,400° C.

The reducing step in the moving hearth furnace at such a temperature allows efficient reduction of chromium oxide.

The method of the present invention preferably further includes a reducing and melting step of melting the reduced mixture provided in the reducing step by successive radiation heating to provide a reduced molten material.

The melting after the reduction causes the aggregation of metal and/or slag to reduce the surface area of the metal and/or slag and the area of the interface between the metal and slag, thereby reducing undesirable reactions such as reoxidation. In addition, the melting following the reduction in the same furnace can avoid a temperature drop that occurs when, for example, the reduced mixture is discharged from the moving hearth furnace after the reduction and is transferred and melted in another apparatus. This method can therefore suppress energy loss in the melting of the reduced mixture.

The method of the present invention preferably further includes a solidifying step of cooling and solidifying the reduced molten material provided by radiation heating in the moving hearth furnace to provide a reduced solid; and a separating step of separating the reduced solid into metal and slag.

According to the present invention, the mixture is reduced and molten in the moving hearth furnace, in which the feedstock placed on the hearth is stationary, to remove slag and recover metal from the mixture. This method therefore requires no smelting furnace, thus significantly reducing equipment cost and energy consumption.

In the present invention, the melting step by radiation heating is preferably performed at a temperature higher than that in the reducing step within the range of 1,350° C. to 1,700° C.

The chromium content of the reduced mixture can be recovered as metal chromium contained in the metal rather than removed as chromium oxide contained in the slag by allowing the reduction of chromium oxide contained in the reduced mixture to proceed sufficiently at 1,250° C. to 1,400° C. before melting the reduced mixture at 1,350° C. to 1,700° C. This method can therefore provide a high yield of chromium.

In the present invention, a carbonaceous atmosphere-adjusting agent is preferably charged together with the mixture onto the hearth of the moving hearth furnace in the reducing step.

If the carbonaceous atmosphere-adjusting agent is charged together with the mixture onto the hearth, volatile components devolatilized from the atmosphere-adjusting agent and gases such as CO and $H_2$ produced in the solution loss reaction of $CO_2$ and $H_2O$ contained in the atmosphere gas keep the vicinity of the mixture in a reducing atmosphere to prevent the reoxidation of the reduced mixture. The volatile components and the gases such as CO and $H_2$ can also be used as fuels for the radiation heating in the moving hearth furnace to reduce the fuel consumption in the moving hearth furnace. In addition, the atmosphere-adjusting agent is converted into a carbon-based material that does not soften at high temperature after the devolatilization. This material can prevent the buildup of deposits on the hearth to reduce the load on a discharger that discharges the reduced mixture (or the reduced molten material or reduced solid) and the abrasion of members such as cutting edges. Furthermore, the carbon-based material discharged together with the reduced mixture (or the reduced molten material or reduced solid) can be used as a reductant and/or heat source in the following smelting step.

BEST MODE FOR CARRYING OUT THE INVENTION

Embodiments of the present invention will now be described in detail with reference to the drawings.

First Embodiment

Figure 1:
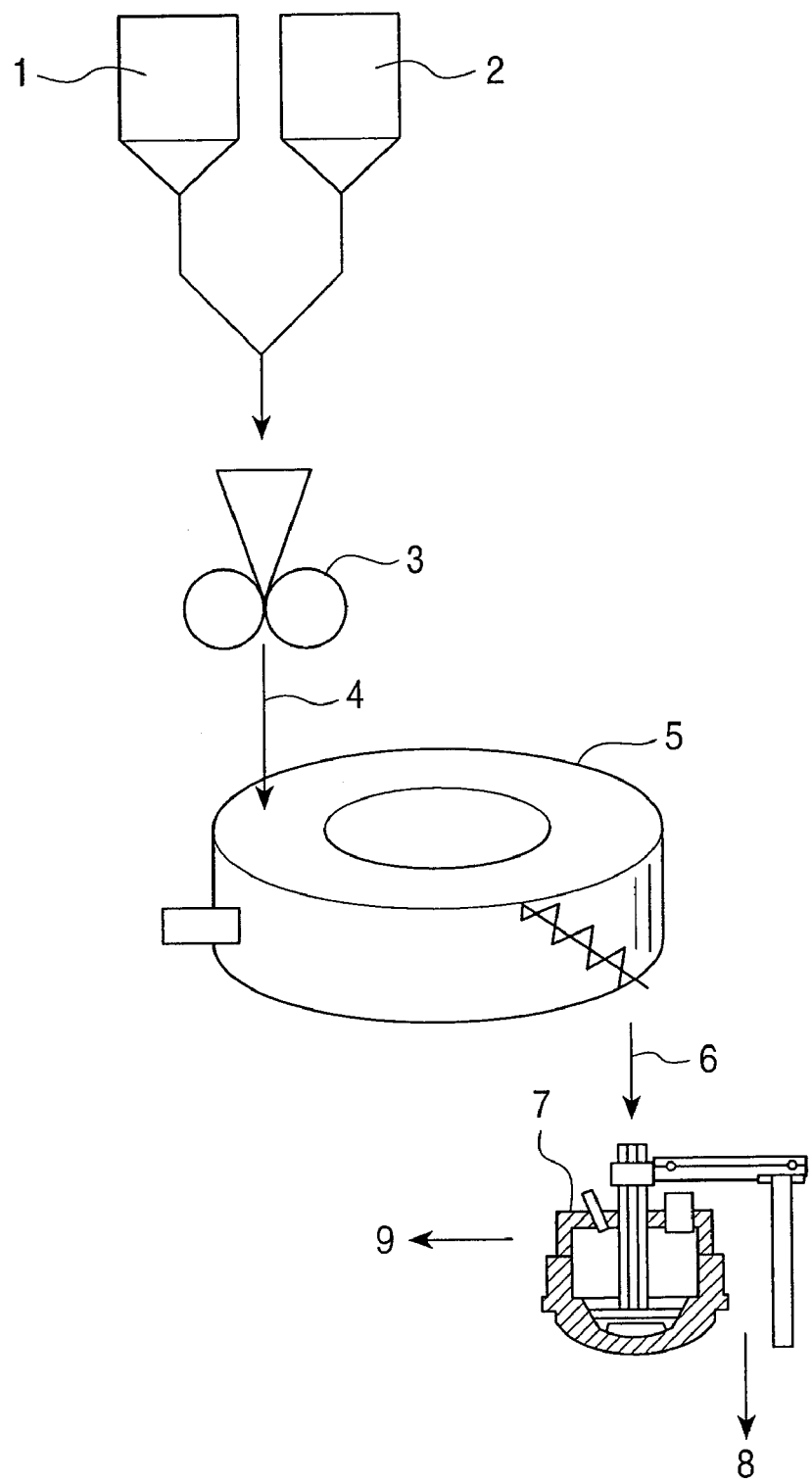
FIG. 1 is a flow chart including a step of reducing a chromium-containing material according to an embodiment of the present invention.

FIG. 1 is a schematic diagram of a process according to an embodiment of the present invention. Reference numeral 1 indicates a storage container for a chromium-containing material containing chromium oxide and iron oxide (or the chromium-containing material); reference numeral 2 indicates a storage container for a carbonaceous reductant; reference numeral 3 indicates a granulator; reference numeral 4 indicates a charging path for a mixture (agglomerates) fed from the granulator 3; reference numeral 5 indicates a moving hearth furnace; reference numeral 6 indicates a transfer path for a reduced mixture (preferably, in the form of agglomerates); reference numeral 7 indicates a smelting furnace; reference numeral 8 indicates a path for recovered metal; and reference numeral 9 indicates a path for removed slag.

The chromium-containing material 1 used may be chromium ore or residues produced in the manufacturing process of ferrochromium, including dust and slag produced at ferrochromium manufacturing plants. The components of the chromium-containing material used may be optionally adjusted by adding iron ore or mill scale. The moving hearth furnace 5, in which a feedstock is stationary on the hearth, is used instead of a rotary kiln, so that no dam ring occurs. In addition, the slag content of the chromium-containing material used is not limited; therefore, the material used may be freely selected. The chromium-containing material, if having a high water content, is preferably dried in advance. The degree of drying may be determined in consideration of mixing means in the following mixing step (the granulator 3 in this embodiment). The carbonaceous reductant used may be any material that contains fixed carbon. Examples of such a material include coal, coke, charcoal, waste toner, carbides of biomass, and their mixtures.

The chromium-containing material and the carbonaceous reductant preferably have a smaller particle size to attain a larger number of contact opportunities in view of the reduction reaction, as described later. Excessively small particles, however, are difficult to granulate. Thus, preferably, about 70% of the particles of the chromium-containing material and the carbonaceous reductant have a particle size not more than 200 mesh (75 μm). These materials are therefore preferably pulverized in advance according to need.

In the present invention, a feedstock mixture (preferably, in the form of agglomerates) provided by mixing the chromium-containing material and the carbonaceous reductant is charged into the moving hearth furnace 5. The mixing ratio of the carbonaceous material in this mixture may be determined according to the amount of carbon required to reduce chromium oxide and iron oxide contained in the mixture in the moving hearth furnace 5; the amount of carbon consumed in, for example, the reduction of residual chromium oxide in the reduced mixture (or a reduced mixture or reduced solid; this description may be omitted) in the smelting furnace 7; and a target amount of carbon remaining in metal (reduced metals such as reduced iron and reduced chromium) recovered from the smelting furnace 7. To increase the chromium reduction degree, it is important that the feedstock mixture contain a larger amount of carbon than a theoretical amount of carbon required, which is described later, in consideration that the reduction of chromium oxide is a solid-phase reaction.

[Mixing step] The chromium-containing material and the carbonaceous reductant are preferably homogeneously mixed with a mixer (not shown in the drawings). The resultant mixture, which may be charged directly into the moving hearth furnace 5, is preferably agglomerated with the granulator 3. The agglomeration can reduce the amount of dust produced from the moving hearth furnace 5 and smelting furnace 7 and improve the heat transfer efficiency inside the feedstock mixture (agglomerates; "feedstock mixture" hereinafter refers to agglomerated feedstock mixture) in the moving hearth furnace 5 to raise the reduction degree. In the agglomeration, an auxiliary material such as a flux may be added to the feedstock mixture. The granulator 3 used may be, for example, a compression molding machine such as a briquetting press, a tumbling granulator such as a disc pelletizer, or an extruder. The granulated feedstock mixture, if having a high water content, may be dried before the charge into the moving hearth furnace 5.

[Reducing step] The granulated feedstock mixture is charged into the moving hearth furnace 5 and is heated by radiation heating. The moving hearth furnace 5 used may be a rotary hearth furnace, a straight furnace, or a multiple hearth furnace. The radiation heating may be conducted with, for example, a burner.

The feedstock mixture charged into the furnace is heated by radiation heating, allowing fixed carbon contained in the carbonaceous reductant to reduce iron oxide and chromium oxide in the mixture according to the following main reaction formulas (1) and (2):

$$FeO+C \rightarrow Fe+CO-36.8 \text{ kcal}$$

$$\Delta G^0=35{,}350-35.9\,T \qquad (1)$$

$$7Cr_2O_3+27C \rightarrow 2Cr_7C_3+21CO-1{,}250.6 \text{ kcal}$$

$$\Delta G^0=1{,}230{,}132-886.97\,T \qquad (2)$$

The reaction of the formula (1) starts at 712° C. while the reaction of the formula (2) starts at 1,114° C. Part of Fe reduced in the formula (1) dissolves in $Cr_7C_3$ produced in the formula (2) to form $(Cr.Fe)_7C_3$.

The average rate of raising the temperature of the feedstock mixture is preferably 13.6° C./s or higher in the period from the initiation of the radiation heating of the feedstock mixture until the feedstock mixture reaches 1,114° C., namely the temperature at which the reduction of chromium oxide starts (see Example 1).

"The initiation of the radiation heating of the feedstock mixture" herein refers to the point in time when the feedstock mixture enters a region (radiation heating region) exposed to radiation heating with, for example, a burner in the moving hearth furnace 5. The above period does not include the period from the charge of the mixture onto the hearth until the mixture enters the radiation heating region for the following reason. In the period from the charge of the feedstock mixture onto the hearth until the mixture enters the radiation heating region, the feedstock mixture is mainly heated only with heat transferred from the hearth. In addition, this period (passage time) is normally short. Accordingly, the feedstock mixture does not reach 712° C., namely the temperature at which the reduction of FeO starts. The fixed carbon content of the internally mixed carbonaceous reductant is therefore not substantially consumed by the reduction of FeO.

The temperature in the radiation heating region (in the reducing step) is preferably 1,250° C. to 1,400° C. At temperatures below 1,250° C., the rate of raising the temperature of the feedstock mixture to 1,114° C. is often insufficient. At temperatures above 1,400° C., on the other hand, a reduced mixture (reduced agglomerates) provided by reducing the feedstock mixture is softened to aggregate or adhere to the hearth.

When, for example, the temperature in the radiation heating region (in the reducing step) is 1,300° C., the residence time of the mixture in the radiation heating region is preferably 5.3 to 42.7 minutes (see Example 1).

A reducing atmosphere is preferably kept in the radiation heating region (in the reducing step) by adjusting the air ratio of the burner or by blowing a reducing gas into the moving hearth furnace 5 to prevent the reoxidation of Fe and $Cr_7C_3$ produced by the reduction.

The reduced mixture provided by reducing the feedstock mixture in the moving hearth furnace 5 is normally cooled to about 1,000° C. with, for example, a radiant cooling plate or a refrigerant spraying machine provided in the moving hearth furnace 5. After the cooling, the reduced mixture is discharged with a discharger.

The above theoretical amount of carbon required refers to the amount of carbon required theoretically for producing $(Cr.Fe)_7C_3$ from iron oxide and chromium oxide contained in the feedstock mixture through the reactions of the above formulas (1) and (2). This theoretical amount is defined by the following equation:

Theoretical amount of carbon required (mol)=(number of moles of $Cr_2O_3$)×27/7+(number of moles of O combined with Fe)+(number of moles of Fe)×3/7

In the above reducing step, it is recommended that a carbonaceous atmosphere-adjusting agent be charged together with the feedstock mixture onto the hearth in the moving hearth furnace 5. The hearth is particularly preferably covered with the atmosphere-adjusting agent before the charge of the feedstock mixture, though a certain effect can be provided by charging the atmosphere-adjusting agent together with the feedstock mixture or after the charge of the feedstock mixture.

As described above, the charge of the carbonaceous atmosphere-adjusting agent has the following typical effects: (1) the agent keeps the vicinity of the feedstock mixture in a reducing atmosphere to prevent the reoxidation of the reduced mixture; (2) volatile components produced from the agent and gases such as CO can be used as fuels for the moving hearth furnace 5 to reduce the fuel consumption in the moving hearth furnace 5; (3) the agent prevents the buildup of deposits on the hearth to reduce the load on the discharger and the abrasion of members such as cutting edges; and (4) the agent discharged together with the reduced mixture after the devolatilization can be used as a reductant and/or heat source in the following smelting step.

The carbonaceous atmosphere-adjusting agent used is preferably coal, waste plastics, waste tires, or biomass. If, for example, coal or biomass is used, it is charred in the moving hearth furnace 5. The volatile components can be used as a fuel in the moving hearth furnace while the charred components can be used as a reductant and/or heat source in the smelting furnace. Other examples of the material used include coke, charcoal, petroleum coke, and char. These materials, containing a less amount of volatile components, have a less effect of reducing the fuel consumption in the moving hearth furnace 5 than the above materials such as coal.

The size (particle diameter) of the atmosphere-adjusting agent is not particularly limited, though it is recommended that the size be 5 mm or smaller on average, more preferably 2 mm or smaller in average.

The thickness of the atmosphere-adjusting agent fed onto the hearth is preferably about 1 to 50 mm.

In addition to the atmosphere-adjusting agent, a hearth-protecting material may be fed to prevent the buildup of deposits on the hearth. Then the atmosphere-adjusting agent is preferably charged onto the hearth-protecting material. The hearth-protecting material preferably contains a material having a high melting point and, more preferably, further contains a carbonaceous material. An oxide containing alumina and/or magnesia or a material containing silicon carbide is recommended as the material having a high melting point.

[Smelting step] The hot reduced mixture discharged from the moving hearth furnace 5 is preferably charged into the smelting furnace 7 without further cooling. The smelting furnace 7 may be directly connected to an outlet of the moving hearth furnace 5 through, for example, a chute. Alternatively, the reduced mixture may be charged into the smelting furnace 7 using transport equipment such as a conveyor or after temporary storage in, for example, a container. If the moving hearth furnace 5 and the smelting furnace 7 are not near to each other or the operation of the smelting furnace 7 is stopped, the reduced mixture may be cooled to room temperature to provide a semi-finished product (a feedstock for refined ferrochromium) for storage and transport before use. Alternatively, the hot reduced mixture is also preferably subjected to hot briquetting to reduce its surface area before cooling to provide a semi-finished product having good reoxidation resistance for storage and transport before use. The smelting furnace 7 used may be an electric furnace or a smelting furnace utilizing a fossil energy such as coal, heavy oil, and natural gases. A flux, for example, is charged into the smelting furnace 7 according to need. The reduced mixture is smelted at a high temperature of 1,400° C. to 1,700° C. to separate the mixture into metal and slag. The metal is used as charge chromium or is optionally subjected to secondary refining to produce ferrochromium.

Second Embodiment

Figure 2:
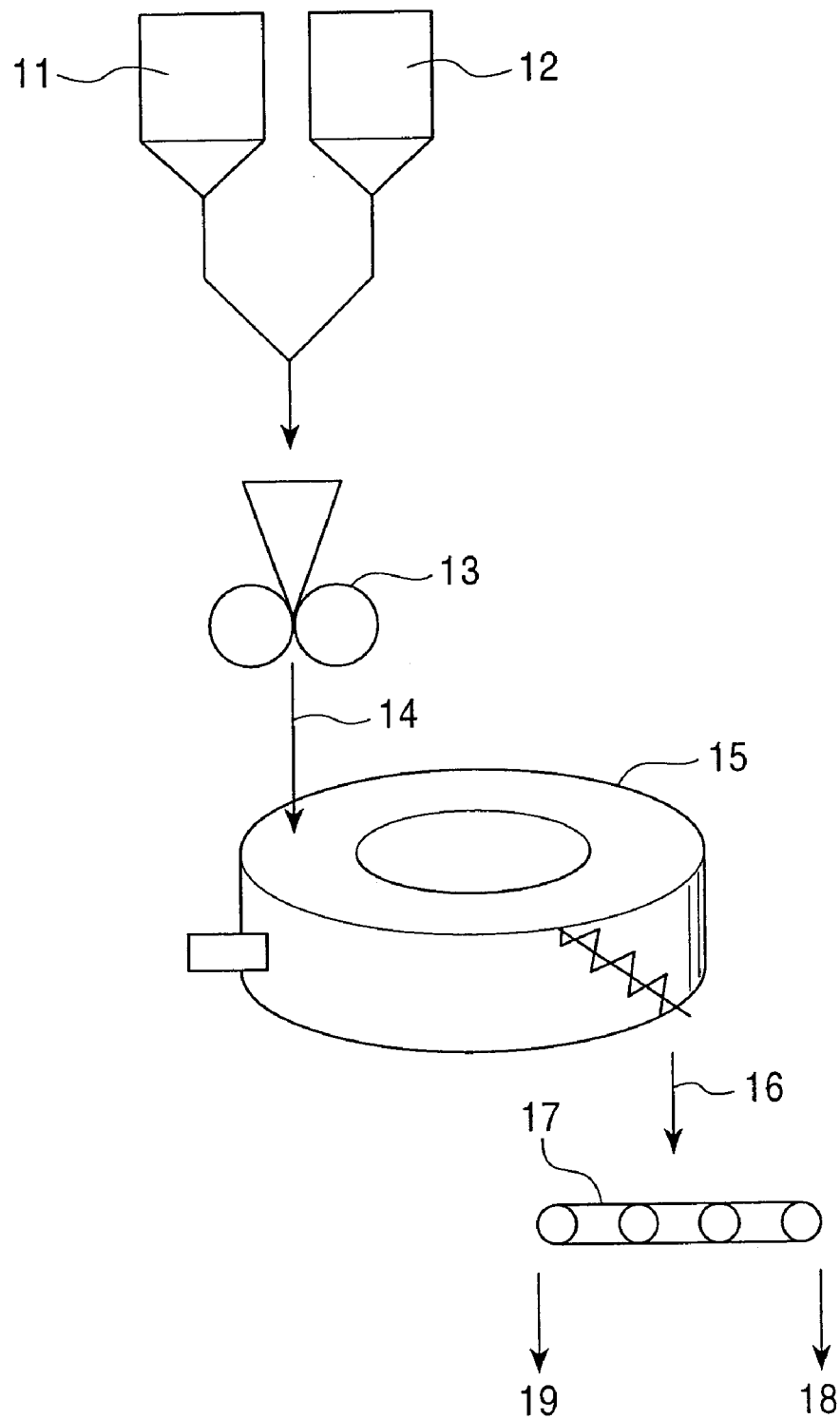
FIG. 2 is a flow chart including a step of reducing a chromium-containing material according to another embodiment of the present invention.

FIG. 2 is a flow chart including a step of reducing a chromium-containing material according to another embodiment of the present invention. In FIG. 2, reference numeral 11 indicates a storage container for a chromium-containing material containing chromium oxide and iron oxide; reference numeral 12 indicates a storage container for a carbonaceous reductant; reference numeral 13 indicates a granulator; reference numeral 14 indicates a path for a mixture (agglomerates); reference numeral 15 indicates a moving hearth furnace; reference numeral 16 indicates a path for a recovered reduced solid; reference numeral 17 indicates a screen; reference numeral 18 indicates a metal path (or metal); and reference numeral 19 indicates a slag path (or slag).

The chromium-containing material, the carbonaceous reductant, the granulator, the feedstock mixture (agglomerates), the moving hearth furnace, and the mixing step in the second embodiment are the same as those in the first embodiment; therefore, they are not described herein.

[Reducing and melting step] The granulated feedstock mixture (agglomerates) is charged into the moving hearth furnace 15 and is heated at 1,250° C. to 1,400° C. by radiation heating. The average rate of raising the temperature of the feedstock mixture by radiation heating, as in the first embodiment described above, is preferably 13.6° C./s or higher in the period from the initiation of the radiation heating of the mixture until the mixture reaches 1,114° C. In addition, the residence time of the feedstock mixture in the radiation heating region is preferably 5.3 to 42.7 minutes.

After the reduction, the resultant reduced mixture (agglomerates) is successively heated and melted to produce a reduced molten material in the moving hearth furnace 15 at a temperature higher than that in the above reduction region (1,250° C. to 1,400° C.), for example 1,350° C. to 1,700° C., preferably 1,350° C. to 1,650° C., more preferably 1,350° C. to 1,600° C. The heating and melting temperature has a lower limit of 1,350° C. because the reduced mixture is difficult to melt at temperatures below 1,350° C. On the other hand, the heating and melting temperature has an upper limit of 1,700° C. because any problem associated with the heat resistance of the reducing furnace readily occurs at temperatures above 1,700° C. The residence time of the reduced mixture in this temperature range is preferably 0.5 to 10 minutes. Within this residence time, the reduced mixture can be sufficiently molten to separate into metal and slag. The residence time of the reduced mixture has a lower limit of 0.5 minutes because the separation into metal and slag is often insufficient within a residence time shorter than 0.5 minutes. On the other hand, the residence time of the reduced mixture has an upper limit of 10 minutes because the separation into metal and slag reaches a saturation level and reoxidation is more likely to occur for a residence time longer than 10 minutes.

In this embodiment, the feedstock mixture is heated in the moving hearth furnace 15 in two temperature steps. In the present invention, the feedstock mixture may also be heated at 1,350° C. to 1,700° C. from the start (in one temperature step) so that the reduction and melting can proceed concurrently to provide the reduced molten material in a shorter time.

Both metal and slag do not necessarily need to be molten. As long as both can be separated, one of them may be unmelted.

The atmosphere-adjusting agent and hearth-protecting material used are the same as those in the first embodiment.

[Solidifying step] The reduced molten material is solidified by cooling it to about 1,000° C. in the moving hearth furnace 15 to produce a reduced solid. Examples of the cooling and solidifying means used in the moving hearth furnace 15 include the radiant cooling plate and refrigerant spraying machine described above in the first embodiment. The reduced solid may be further cooled after the discharge from the moving hearth furnace 15 by cooling and solidifying means such as water granulation, indirect water cooling, and refrigerant spraying.

[Separating step] The reduced solid is disintegrated according to need and is separated through a screen 17 into metal (crude ferrochromium) 18 and slag 19. The metal content of the separated slag 19 may be optionally recovered by means such as magnetic separation and flotation. The separated metal (crude ferrochromium) 18 is optionally subjected to secondary refining to produce a ferrochromium product. Alternatively, the metal (crude ferrochromium) 18 may be used as a semi-finished product (a feedstock for refined ferrochromium) to be smelted in a smelting furnace. In the method of the first embodiment, the semi-finished product, namely the reduced agglomerates, contains residual slag. In the method of the second embodiment, on the other hand, the slag content has been removed from the semi-finished product, namely the metal 18, so that the smelting furnace requires no smelting energy for removing the slag content. The method of the second embodiment can therefore greatly reduce the energy consumption of the smelting furnace. In addition, this method can significantly reduce the amount of slag produced in the smelting furnace to greatly improve the production efficiency of the smelting furnace. The metal (crude ferrochromium) 18 may be used as a feedstock for ferrochromium, or may be directly used as a feed stock for manufacturing chromium-containing alloys. The present invention is preferred for implementation at production sites of chromium ore since the weight of the semi-finished product can be reduced by the slag content to cut down its storage and transport costs. In addition, the metal (crude ferrochromium) 18 may be optionally agglomerated for convenience in storage and transport.

The atmosphere-adjusting agent used may be recovered for recycling, or may be charged together with the metal into the smelting furnace. In addition, the hearth-protecting material used is preferably recovered for recycling.

EXAMPLES

Example 1

The following reduction experiment was conducted with a small heating furnace for laboratory use to grasp the reduction condition of a mixture in a moving hearth furnace according to the present invention.

A feedstock having a composition shown in Table 1, as the chromium-containing material, and coke breeze (fixed carbon content: 77.7 percent by mass), as the carbonaceous reductant, were mixed at a mass ratio of 85.7:14.3. A proper amount of water was added to the mixture, which was then granulated with a small disc pelletizer to prepare pellets having a diameter of 13 mm. These pellets were dried, were charged in batches into the small heating furnace, and were heated and reduced at a constant temperature for different retention times. The compositions of the pellets after the reduction were chemically analyzed to determine their Cr reduction degrees and Fe metallization degrees. This experiment was conducted in a nitrogen atmosphere at 1,200° C. and 1,300° C.

TABLE 1

| T. Fe | FeO | M. Fe | T. Cr | M. Cr |
|---|---|---|---|---|
| 27.5 | 3.0 | 5.5 | 6.1 | 0.5 |

(Unit: mass percent)

Figure 3:
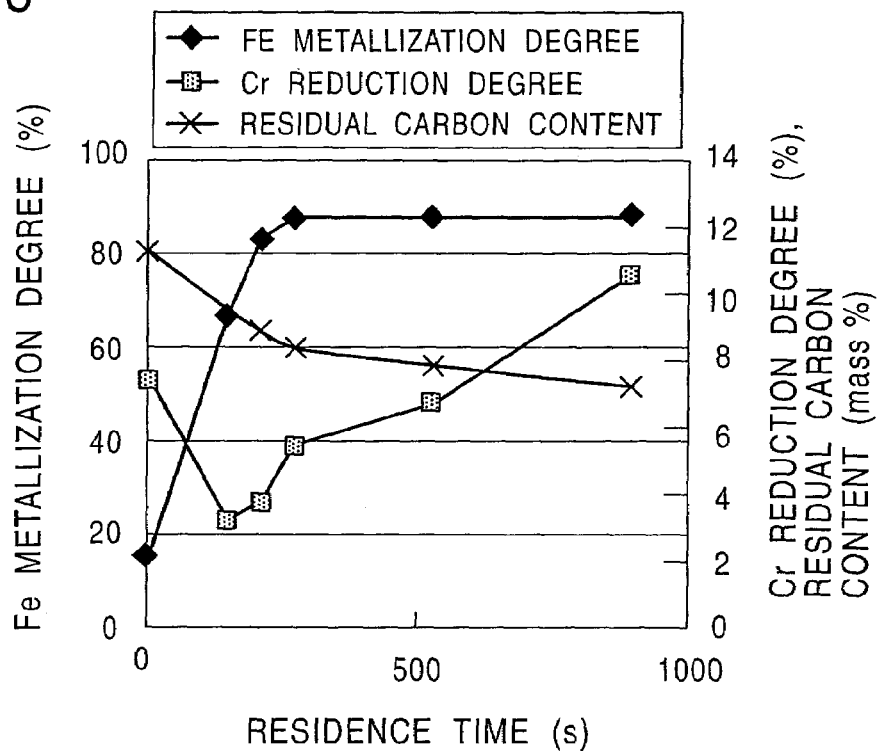
FIG. 3 is a graph showing the relationship between residence time and Cr reduction degree, Fe metallization degree, and residual carbon content at 1,200° C.
Figure 4:
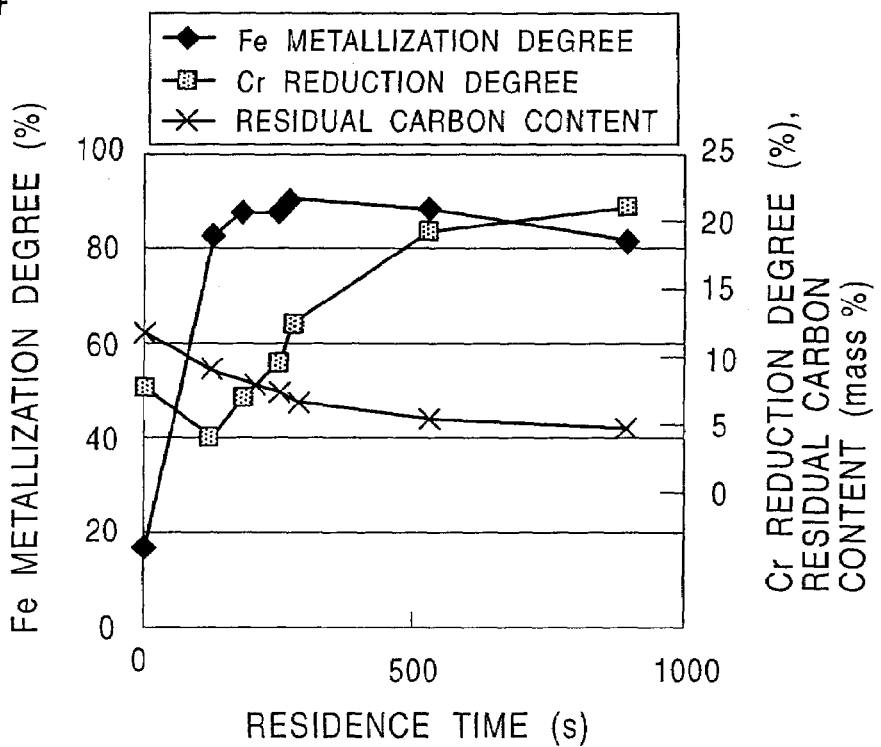
FIG. 4 is a graph showing the relationship between the residence time and the Cr reduction degree, the Fe metallization degree, and the residual carbon content at 1,300° C.

FIGS. 3 and 4 show the experimental results of the relationship between the retention time (residence time) and the Cr reduction degree, the Fe metallization degree, and residual carbon content. The Cr reduction degree and the Fe metallization degree are defined as follows:

Cr reduction degree (%)=(metal chromium content (mass percent)+chromium content of chromium carbide (mass percent))/total chromium content (mass percent)×100

Fe metallization degree (%)=(metal iron content (mass percent)+content of iron dissolved in chromium carbide (mass percent))/total iron content (mass percent)×100

FIG. 3 shows the results at 1,200° C. while FIG. 4 shows the results at 1,300° C. As can be seen from FIGS. 3 and 4, the reduction of iron preceded that of chromium at either temperature. The Cr reduction degrees temporarily dropped immediately after the initiation of the experiment before they rose. This temporary drop occurred probably because metal chromium contained in the initial feedstock (see Table 1) reacted directly with iron oxide to reduce the iron oxide and oxidize itself before the pellets reached the temperature at which the reduction of chromium oxide started. In addition, the results show that the reduction degree was significantly higher at 1,300° C. than that at 1,200° C.

The Cr reduction degree at time t (s) is represented by the following formula (3):

$$R_{Cr}(\%)=A(1-\exp(-t/\tau))+k \qquad (3)$$

where $R_{Cr}$ is the Cr reduction degree; $\tau$ is a time constant; and A and k are constants. The temporary drop of the Cr reduction degree immediately after the initiation of the experiment was excluded from the formula (3).

FIGS. 3 and 4 show that time constant $\tau$ at 1,200° C. was about 1,240 seconds (about 20.7 minutes) and time constant $\tau$ at 1,300° C. was about 320 seconds (about 5.3 minutes). The reduction of chromium oxide proceeded even at 1,200° C., but took an extremely long time and was therefore inefficient. Accordingly, the reduction is preferably performed at 1,250° C. or higher, more preferably 1,300° C. or higher.

The reaction time (residence time) of the pellets (mixture) may be determined according to, for example, target product quality and productivity; in terms of time constant $\tau$ above, the residence time is preferably 1 $\tau$ to 8 $\tau$. If the residence time is lower than 1 $\tau$, only about less than 40% of the chromium content to be metallized is reduced. If, on the other hand, the residence time is higher than 8 $\tau$, the reduction reaches a saturation level and reoxidation is more likely to occur. When, for example, the reduction is performed at 1,300° C., the residence time of the pellets (mixture) is preferably 5.3 to 42.7 minutes, namely 1 $\tau$ to 8 $\tau$ at this temperature.

To attain a sufficiently high Cr reduction degree, as described above, the reduction of chromium oxide must be allowed to start before the internally added carbonaceous material is consumed. To that end, by the time the Fe metallization degree reaches 50%, the temperature of the pellets (mixture) must be raised to at least 1,114° C., which is the temperature at which the reduction of chromium oxide starts. According to FIG. 4, the Fe metallization degree reached 80% or higher at 1,300° C. for a pellet residence time of 125 seconds; therefore, the estimated residence time of the pellets (mixture) for which the Fe metallization degree reached 50% is about 78 seconds. The temperature at which the pellets (mixture) were charged into the small heating furnace was about 25° C. Hence, the temperature of the pellets must be raised by 1,089° C. (1,114° C.−25° C.=1,089° C.) for 78 seconds. The average temperature raising rate in this residence time is 13.96° C./s (1,089° C./78 seconds=13.96° C./s). Accordingly, the average rate of raising the temperature of the pellets (mixture) is preferably 13.96° C./s or higher.

Next, as an example in which the content of the internally added carbonaceous material in the pellets is increased, a similar reduction experiment was conducted at 1,300° C. where the mixing ratio (mass ratio) of the chromium-containing material and the coke breeze was changed to 83.7:16.3. When the mixing ratio of the coke breeze was 14.3 percent by mass, the Cr reduction degree was 9.6%. When, on the other hand, the mixing ratio of the coke breeze was increased to 16.3 percent by mass, the Cr reduction degree rose significantly to 14.7%. This effect probably resulted from an increase in the contact opportunity between the chromium-containing material and the carbonaceous reductant.

Example 2

In this example, a different feedstock and carbonaceous reductant from those in Example 1 were used. Chromium ore having a composition shown in Table 2 was used as the chromium-containing material, and coal having a composition shown in Table 3 was used as the carbonaceous reductant. The chromium ore and the coal were pulverized such that about 80 percent by mass of the chromium ore and the coal had a particle size of 75 μm or less. The chromium ore and the coal were mixed at a ratio (mass ratio) of 73:27 and were agglomerated into tablets having a diameter of 20 mm and a thickness of 9 mm. These tablets were heated and reduced at 1,350° C. for 36 minutes. In this reduction experiment, the temperature change of the tablets was measured by attaching a thermocouple to the tablets to grasp the temperature raising rate of the tablets. As a result, the time required from the charge of the tablets into the small heating furnace until the tablets reached 1,200° C. was about 60 seconds. In addition, the Cr reduction degree of the tablets after the reduction reached 90%.

TABLE 2

| T. Fe | $Cr_2O_3$ | $SiO_2$ | $Al_2O_3$ | MgO |
|---|---|---|---|---|
| 8.2 | 35.7 | 15.1 | 6.0 | 24.2 |

(Unit: mass percent)

TABLE 3

| F. C | VM | Ash |
|---|---|---|
| 71.9 | 17.8 | 10.3 |

(Unit: mass percent)

Example 3

The same chromium ore and coal as those in Example 2 were used, and tablets having a diameter of 20 mm and a thickness of 9 mm were formed at different mixing ratios. Reduction experiments were conducted in which the tablets were maintained in the same small heating furnace as that in Examples 1 and 2 at 1,350° C. for 20 minutes. Table 4 shows the relationship between the mixing ratio and the Cr reduction degree and crushing strength of the tablets after the reduction. The rate of raising the temperature of the tablets was the same as that in Example 2.

TABLE 4

| | Mixing ratio | | After reduction | |
|---|---|---|---|---|
| | (mass ratio) | | Cr | Crushing |
| Experiment No. | Chromium ore | Coal | reduction degree (%) | strength (kg/tablet) |
| 1 | 80 | 20 | 80 | 17.1 |
| 2 | 73 | 27 | 78 | 11.5 |
| 3 | 57 | 33 | 75 | 9.7 |

"T. Fe" indicates total iron content;
"M. Fe" indicates metal iron;
"T. Cr" indicates total chromium content;
"M. Cr" indicates metal chromium;
"F. C" indicates fixed carbon;
"VM" indicates volatile matter content; and
"Ash" indicates ash content.

The above results show that the tablets after the reduction in this example had a high Cr reduction degree of about 80% and a sufficiently high crushing strength to prevent problems such as disintegration in transport or smelting. According to the results, a tablet having a lower coal mixing ratio attains a higher crushing strength after the reduction.

INDUSTRIAL APPLICABILITY

According to the present invention, when a feedstock mixture provided by mixing a chromium-containing material that contains chromium oxide and iron oxide and a carbonaceous reductant is reduced, the reduction of chromium oxide can be promoted while suppressing preferential consumption of the internally added carbonaceous material in the reduction of iron oxide, thereby raising the chromium reduction degree. In addition, the reduced chromium having a high chromium reduction degree may be smelted in a smelting furnace as a feedstock for refined ferrochromium to produce ferrochromium with a high yield of chromium. Furthermore, the reduced chromium may be used as charge chromium or, if necessary, may be subjected to secondary refining to produce ferrochromium, rather than smelted in a smelting furnace. In this case, the use of a smelting furnace can be eliminated to significantly reduce equipment cost and energy consumption.

The invention claimed is:

1. A method for reducing a chromium-containing material, comprising:
   mixing a chromium-containing material comprising chromium oxide and iron oxide and a carbonaceous reductant to provide a mixture;
   charging a carbonaceous atmosphere-adjusting agent together with the mixture to a moving hearth furnace; and
   heating and reducing the mixture with a rapid temperature rise by radiation heating in the moving hearth furnace to provide a reduced mixture,
   wherein the carbonaceous atmosphere-adjusting agent is a different material from the carbonaceous reductant, and
   wherein the average rate of raising the temperature of the mixture in said reducing is 13.6° C./s or higher in the period from the initiation of the radiation heating of the mixture until the mixture reaches 1,114° C.

2. A method for reducing a chromium-containing material, comprising:

mixing a chromium-containing material comprising chromium oxide and iron oxide and a carbonaceous reductant to provide a mixture;

charging a carbonaceous atmosphere-adjusting agent to a moving hearth furnace and then charging the mixture to the moving hearth furnace; and heating and reducing the mixture with a rapid temperature rise by radiation heating in the moving hearth furnace to provide a reduced mixture, wherein the carbonaceous atmosphere-adjusting agent is a different material from the carbonaceous reductant, and wherein the average rate of raising the temperature of the mixture in said reducing is 13.6° C./s or higher in the period from the initiation of the radiation heating of the mixture until the mixture reaches 1,114° C.

3. The method for reducing a chromium-containing material according to claim 1 or 2, wherein a particle diameter of the carbonaceous atmosphere-adjusting agent is 5 mm or smaller on average.

4. The method for reducing a chromium-containing material according to claim 1 or 2, wherein the average rate of raising the temperature of the mixture in said reducing is 13.96° C./s or higher in the period from the initiation of the radiation heating of the mixture until the mixture reaches 1,114° C.

5. The method for reducing a chromium-containing material according to claim 1 or 2, further comprising charging a hearth-protecting material onto the hearth in the moving hearth furnace before the charging of the carbonaceous atmosphere-adjusting agent.

6. The method for reducing a chromium-containing material according to claim 5, wherein the hearth-protecting material comprises an oxide material comprising alumina and/or magnesia or a material comprising silicon carbide.

7. The method for reducing a chromium-containing material according to claim 6, wherein the hearth-protecting material further comprises a carbonaceous material.

8. The method for reducing a chromium-containing material according to claim 1 or 2, further comprising smelting the reduced mixture in a smelting furnace after discharging and charging the reduced mixture from the moving hearth furnace into the smelting furnace without cooling.

9. The method for reducing a chromium-containing material according to claim 8, wherein the carbonaceous atmosphere-adjusting agent is charged together with the reduced mixture into the smelting furnace.

10. The method for reducing a chromium-containing material according to claim 1 or 2, further comprising recycling the carbonaceous atmosphere-adjusting agent.

11. The method for reducing a chromium-containing material according to claim 1 or 2, further comprising melting the reduced mixture by successive radiation heating to provide a reduced molten material.

12. The method for reducing a chromium-containing material according to claim 11, further comprising cooling and solidifying the reduced molten material in the moving hearth furnace to provide a reduced solid; and separating the reduced solid into metal and slag.

13. The method for reducing a chromium-containing material according to claim 11, wherein said reducing is performed at 1,250° C. to 1,400° C.; and said successive radiation heating is performed at a temperature higher than that in said reducing and within a range of 1,350° C. to 1,700° C.

14. The method for reducing a chromium-containing material according to claim 11, further comprising smelting metal from said reduced molten material in a smelting furnace after charging the metal together with the carbonaceous atmosphere-adjusting agent into the smelting furnace.

15. The method for reducing a chromium-containing material according to claim 2, wherein a thickness of the carbonaceous atmosphere-adjusting agent fed to the moving hearth furnace is 1 mm to 50 mm.

* * * * *